United States Patent
Niemeyer et al.

(10) Patent No.: US 10,606,282 B2
(45) Date of Patent: Mar. 31, 2020

(54) ROBOT WITH INERTIA SHIFTING ASSEMBLY PROVIDING SPIN CONTROL DURING FLIGHT

(71) Applicant: DISNEY ENTERPRISES, INC., Burbank, CA (US)

(72) Inventors: Gunter D. Niemeyer, Pasadena, CA (US); Morgan T. Pope, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 207 days.

(21) Appl. No.: 15/719,847

(22) Filed: Sep. 29, 2017

(65) Prior Publication Data

US 2019/0022858 A1    Jan. 24, 2019

Related U.S. Application Data

(60) Provisional application No. 62/534,858, filed on Jul. 20, 2017.

(51) Int. Cl.
*G05D 1/08* (2006.01)
*B25J 13/08* (2006.01)
(Continued)

(52) U.S. Cl.
CPC .......... *G05D 1/0808* (2013.01); *B25J 9/1607* (2013.01); *B25J 9/1615* (2013.01);
(Continued)

(58) Field of Classification Search
CPC ...... B25J 9/1607; B25J 9/1615; B25J 11/003; B25J 11/0035; B25J 13/08; B25J 13/086;
(Continued)

(56) References Cited

U.S. PATENT DOCUMENTS 9,613,539 B1    4/2017   Lindskog et al.
10,118,696 B1 *  11/2018  Hoffberg ............... B64C 39/001
(Continued)

OTHER PUBLICATIONS

Playter, Robert R., et al, "Control of a Biped Somersault in 3D," Proceedings of the 1992 IEEE/RSJ International Conference on Intelligent Robots and Systems, vol. 1, pp. 582-589, Jul. 7, 1992.
(Continued)

*Primary Examiner* — Spencer D Patton
(74) *Attorney, Agent, or Firm* — Snell & Wilmer LLP; Kent A. Lembke

(57) ABSTRACT

A robot configured to provide accurate control over the rate of spin or rotation of the robot. To control the rate of spin, the robot includes an inertia shifting (or moving) assembly positioned within the robot's body so that the robot can land on a surface with a target orientation and "stick the landing" of a gymnastic maneuver. The inertia shifting assembly includes sensors that allow the distance from the landing surface (or height) to be determined and that allow other parameters useful in controlling the robot to be calculated such as present orientation. In one embodiment, the sensors include an inertial measurement unit (IMU) and a laser range finder, and a controller processes their outputs to estimate orientation and angular velocity. The controller selects the right point of the flight to operate a drive mechanism in the inertia shifting assembly to achieve a targeted orientation.

16 Claims, 11 Drawing Sheets

(51) Int. Cl.
*B64C 17/02* (2006.01)
*B25J 9/16* (2006.01)
*B25J 11/00* (2006.01)
*B25J 19/00* (2006.01)

(52) U.S. Cl.
CPC .......... *B25J 11/003* (2013.01); *B25J 11/0035* (2013.01); *B25J 13/08* (2013.01); *B25J 13/089* (2013.01); *B25J 19/0008* (2013.01); *B64C 17/02* (2013.01); *B25J 13/086* (2013.01)

(58) Field of Classification Search
CPC .................. B25J 13/088; B25J 13/089; B25J 19/0008–002; B64C 17/02; G05D 1/08–0825
See application file for complete search history.

(56) References Cited

U.S. PATENT DOCUMENTS

2013/0257582 A1* 10/2013 Rothkopf .............. G06F 1/1656
340/3.1
2013/0282174 A1 10/2013 Xi et al.

OTHER PUBLICATIONS

Rhodri, Armour, et al, "Jumping Robots: A Biomimetic Solution to Locomotion Across Rough Terrain," Bioinspiration & Biomimetics, Institute of Physics Publishing, Bristol, GB, vol. 2, No. 3, pp. S65-S82, Sep. 1, 2007.
European Search Report for EP Application No. 18167849.1, dated Nov. 27, 2018.

* cited by examiner

ROBOT WITH INERTIA SHIFTING ASSEMBLY PROVIDING SPIN CONTROL DURING FLIGHT

CROSS REFERENCE TO RELATED APPLICATIONS

This application claims priority to U.S. Provisional Pat. Appl. No. 62/534,858, filed Jul. 20, 2017, which is incorporated herein by reference in its entirety.

BACKGROUND

1. Field of the Description

The present description relates, in general, to robots and robotic motion control technology, and, more particularly, to robots and robot control methods adapted to control spin during flight such as during a drop or fall to provide a desired or target orientation and/or pose upon landing on a surface.

2. Relevant Background

There are a number of applications where it is desirable to control the rotation or spin of a robot as it flies or falls from a raised platform or support onto a landing surface. For example, robots may be used in entertainment settings or shows, and it may be desirable for a robot to make an exciting and energetic entrance onto a stage. This may involve the robot being launched or released in the air such that it is rapidly spinning, and the show designers may call for the robot to land with precision such as on its "feet" (or with a particular vertical pose) and with a particular orientation (position of its body's central axis relative to a horizontal plane).

To date, though, it has proven difficult to create robots that tumble through the air at high speeds and high spin rates. To date, most efforts at controlling a robot's movements while in the air or flying have involved relatively complex robotic devices and controls. For example, some robots have been designed with a tail, and the tail is moved while the robot is in the air in an attempt to control the robot's orientation upon landing. In another example, legged robots are controlled to move their legs during jumping and other "flight" type movements to control the pose or orientation of the robot when it lands. While useful in some applications, these robots are relatively complex and expensive to build and control and have not been wholly successful in providing accurate control of the robot's movement or spin during flight. As a result, there remains a demand for less complex robot designs that provide control over spin or rotation during flight or falling.

SUMMARY

Briefly, a robot (and robot control method) is provided that is configured to provide accurate control over the rate of spin or rotation of the robot (in one or more planes with horizontal spin being one example). This allows the robot to tumble through the air (such as after being launched from an elevated position at a desired spin rate and direction) at a high speed and high spin rate. To control the rate of spin, the robot includes an inertia shifting (or moving) assembly positioned within the robot's body so that the robot can land on a surface with a target orientation (and a target pose in some cases). In this way, the robot can be caused to jump or fall through hoops and "stick the landing" of a gymnastic maneuver.

The inertia shifting assembly includes sensors that allow the distance from the landing surface (or height) to be determined and that allow other parameters useful in controlling the robot to be calculated such as present orientation. In one embodiment, the sensors include an inertial measurement unit (IMU) and a laser range finder, and a controller processes their outputs to estimate orientation and angular velocity. The controller then selects the right point of the flight (e.g., time and/or distance from the landing surface) to operate a drive mechanism in the inertia shifting assembly to achieve a targeted orientation upon impact with the landing surface. The drive mechanism may include two movable weights that can be moved within the interior space of the body to shift or move the body's inertia (e.g., dramatically changing the inertia of the robot) so as to modify the spin rate and achieve the desired orientation.

In one specific embodiment, the weights take the form of two blocks (e.g., metal or other relatively heavy blocks) that are held in the middle of the robot's body by a latch. When unlatched, the blocks are pulled rapidly by springs and cables to the outer ends of the interior space of the robot's body, which slows the rotation in a manner similar to a spinning ice skater who extends their arms. In this example, the drive mechanism can only be operated once during the flight/fall to shift inertia, but, when the change in the rotation rate (which is provided by a shift in inertia) is triggered by the controller at the proper time during the flight/fall, the robot is capable of hitting a target orientation at the end of its flight (at contact with the landing surface).

The robots described herein are well-suited to small terrestrial robots with power limitations because the inertia shifting assembly acts faster and requires less power than other orientation control approaches (such as thrusters, flywheels, and the like). The inertia shifting assembly can be provided wholly internally to the robot's body such that during rotation/spin control its operations do not change the external appearance of the robot, which is in contrast to use of a robotic tail. The inertia shifting assembly can also permanently alter the spin rate of the robot in contrast to a robotic tail. In testing, the inertia shifting assembly has been used to change final orientation of a robot by more than 180 degrees.

More particularly, a robot is provided that is adapted to have spin control via inertia shifting or movement using internally positioned/located components. The robot includes an outer shell or body with an interior space and an inertia shifting assembly positioned within the interior space. The inertia shifting assembly includes a sensor assembly operable for collecting sensor data for the robot during a flight (e.g., a freefall from a launch mechanism providing it an arbitrary spin/rotation onto a landing surface or through an obstacle with a hole/gap). The inertia shifting assembly also includes a controller processing the sensor data to generate a control signal to affect rotation/spin of the robot, and a drive mechanism is provided that operates in response to the control signal to shift the moment of inertia of the robot so as to modify rotation during the freefall.

In some embodiments, the controller is configured (with hardware and/or software/logic run by the hardware, e.g., a processor with memory) to process the sensor data to predict an orientation of the body at a point of the freefall, to compare the predicted orientation to a target orientation for the body at the point of the freefall, and to generate the control signal to cause the predicted orientation to match the target orientation. The sensor assembly may include an external-looking sensor and an internal sensor, and the controller determines a present orientation of the body and a height of the body above a landing surface. The present orientation and the height are used, by the controller's logic, to determine the predicted orientation. In some cases, the external-looking sensor includes a rangefinder (e.g., a laser rangefinder such as a LIDAR device).

In some cases, the drive mechanism includes at least one weight and an assembly for moving the at least one weight relative to the center of mass of the robot in response to the control signal. For example, the assembly for moving the at least one weight may include a release (e.g., a servo moving an arm) operable to retain the at least one weight proximate to the center of mass and to selectively release the at least one weight to travel from a first position to a second position within the interior space. In other implementations, the assembly for moving the at least one weight in other cases may include a rail for slidingly supporting the at least one weight, a servo, and a linkage attached to the at least one weight for selective positioning the at least one weight along the rail at a plurality of positions relative to the center of mass. In some embodiments, the rotation is about a vertical axis of the body that is orthogonal to a horizontal plane passing through the body of the robot.

DETAILED DESCRIPTION

The inventors recognized that there are a number of settings where it may be desirable to provide a "stunt" robot that can be used in place of a more complex and costly robot to perform a fall or drop and "stick the landing." In other words, a robot with a relatively simple design can be substituted for another robot prior to being launched or dropped to make an energetic entrance onto a show stage as one example. The launching may be done to provide an initial spin of the stunt robot in one or more directions or planes (such as in the horizontal plane about its central axis), and the stunt robot can be designed to land with a desired orientation and/or pose (e.g., land on its feet or the like). To this end, the robots described herein are adapted to be able to control their own rotation to correct for imperfections in the launch.

Each robot includes an assembly configured to shift or move the robot's inertia so as to control the rate of spin (e.g., horizontally and, in some cases, vertically). The robot includes a body, and the inertia shifting assembly is typically wholly provided within the interior space of the body. Stated differently, the inertia shifting components of the robot are all internal to the robot's body so the length and/or shape of the robot's body does not change during flight and so that the robot does not need to include complex moving parts on its exterior surfaces. The inertia shifting assembly includes onboard sensors (including external-looking sensors) to sense data such as orientation, height above the landing surface, velocity, and so on during the flight (or fall), and a controller processes and uses this sensor data and calculated parameters to generate control signals for a drive mechanism that acts, when necessary, to shift or move the inertia so as to modify the spin (in one or more planes). In this manner, the robot is able to predict what its orientation and/or pose will be upon impact, to determine if a change in the present spin is needed to achieve a targeted orientation and/or pose, and to generate control signals to operate the drive mechanism to shift/move the inertia of the robot to modify the rotation or spin of the robot during its fall onto a landing surface (e.g., the robot provided controlled tumbling in any plane).

Figure 1:
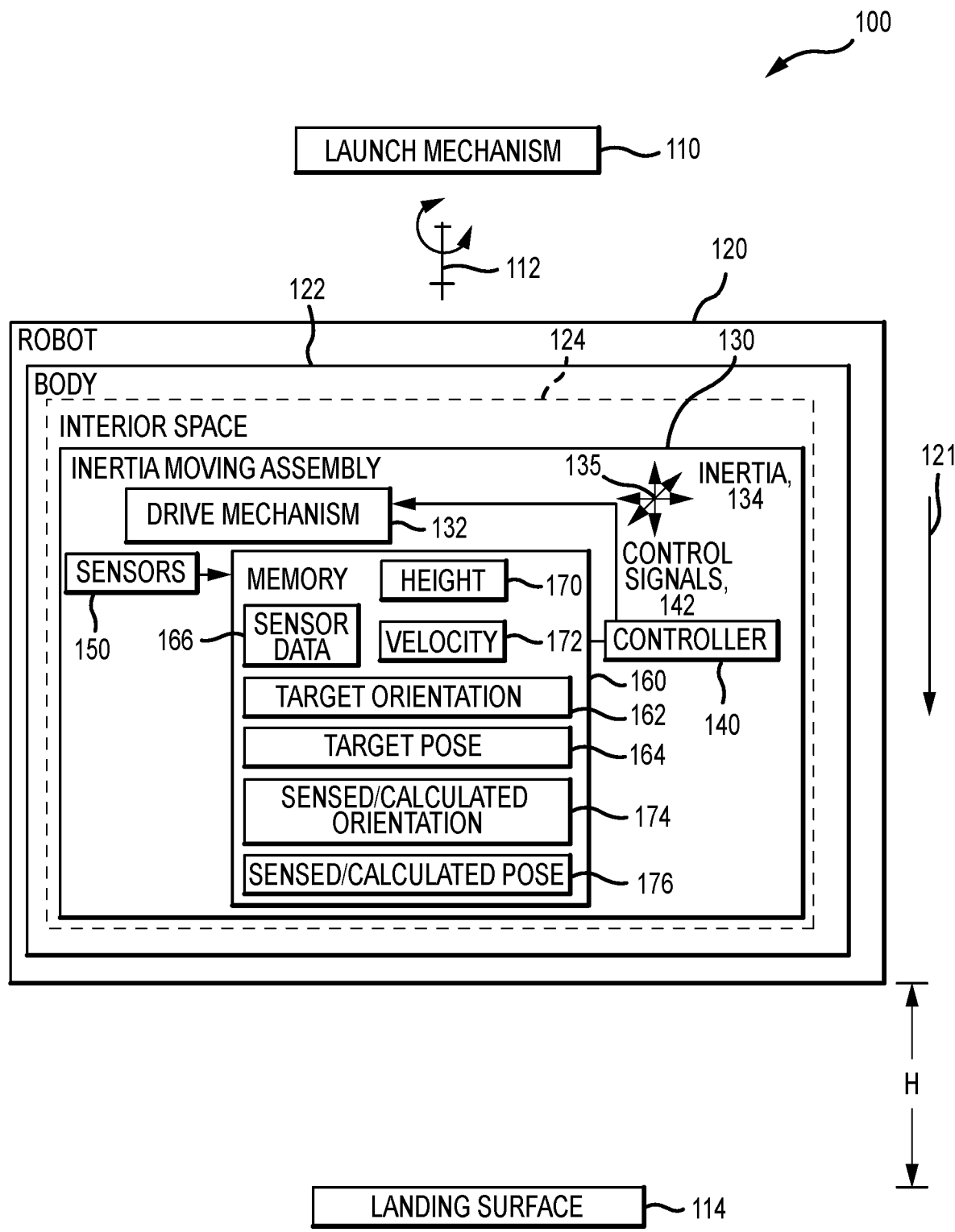
FIG. 1 is functional block diagram of a robot flight system according to the present description.

FIG. 1 is a functional block diagram of an exemplary robot flight (or fall/drop) system 100 that provides controlled spin or rotation of a robot 120 during its flight or fall onto a landing surface 114. The system 100 includes a launch mechanism 110 that acts to first hold or support the robot 120 at a desired height above the landing surface 114 and to second release or launch the robot 120 such that it has an initial spin (or rotation) (e.g., about its center or about its central axis such as when spinning in one plane such as the horizontal plane), which may be in one or more directions and in one or more planes as shown by arrows 112 (such as in one or both of the horizontal and vertical planes). The launch mechanism 110 is adapted to provide a relatively predictable spin at launch that is intended to cause the robot 120 to land with a target orientation (e.g., position of its body in the horizontal plane) and/or target pose (e.g., position of its body in the vertical plane) as shown being stored in memory 160 of the robot 120 at 162 and 164, respectively. However, the launch mechanism 110 often will not be able to provide a perfect launch, and the robot 120 is designed to control the spin 112 as it falls (moves downward) 121 onto the landing surface 114.

To this end, the robot 120 includes a body (or outer shell, enclosure, housing, or the like) 122 that defines (such as with outer sidewalls) an interior space 124. In simple examples, the body 122 may be rectangular in shape with a length and a width that do not change during the fall 121 (during inertia shifting/moving). In other examples, the body 122 may be cylindrical in shape with a fixed length and diameter during the flight/fall 121. The body 122, however, may take a wide variety of other shapes (such as the torso of a humanoid-type robot), with an important concept being that the shape and length of the body 122 are not necessarily changed during the fall 121 because inertia shifting is provided by components of the robot 120 provided in the interior space 124 of the body 122.

Particularly, the robot 120 includes an inertia moving (or shifting) assembly 130 positioned in the interior space 124 of the body 122. The assembly 130 includes a drive mechanism 132 that operates in response to control signals 142 from a controller 140 to selectively shift or move the inertia 134 of the robot's body 122 as shown with arrows 135 (in either direction in one, two, or more planes (e.g., in the horizontal plane and/or in the vertical plane)). The drive mechanism 132 may take a number of forms to implement the robot 120 as discussed below, and the controller 140 typically will include a processor(s) that runs control software/programs configured to perform the functions described herein.

Further, the assembly 130 includes memory or data storage 160 whose access and operations are managed by the controller 140. The memory 160 is used to store a target orientation 162 and a target pose 164 for the body 122 upon contact with the landing surface 114. The assembly 130 includes sensors 150 that function to gather sensor data 166 during the flight/fall 121. The sensor data 166 is stored in memory 160 and processed/used by the controller 140 to generate the control signals 142. Specifically, the sensor data 166 may be processed to determine at a plurality of times (e.g., periodic or nearly continuously) a height, H, of the robot 120 above the landing surface 114, which is stored in memory 160 as shown at 170. In some embodiments, the sensors 150 include an inertial measurement unit (IMU) to provide velocity and/or acceleration data for the body 122. The IMU will not provide an absolute position for the body 122 (distance, angle, or the like) such that the sensors 150 preferably include one or more external-looking sensors to correct for these deficiencies of the IMU by providing data useful for determining the height, H, and/or other parameters (e.g., current orientation and/or pose). The external-looking sensors may include LIDAR, laser, and/or ultrasound-based devices facing the landing surface 114 (at least periodically during the flight/fall 121).

The controller 140 may further process the sensor data 155 to determine/calculate the present orientation 174 and pose 176 of the robot's body 122 as well as the present velocity 172. All or a portion of the sensor data and determined parameters are then used on a periodic (or nearly continuous) manner by the controller 140 to predict whether the rotation/spin 112 of the robot's body 122 should be modified/controlled to achieve the target orientation 162 and/or the target pose 164 at the time of contact with the landing surface 114. If not, the controller 140 determines a desired modification of the spin 112 and a shifting or movement 135 of the inertia 134 that may achieve the modification of the spin 112, and, in response, control signals 142 are generated to operate the drive mechanism 132 to move/shift 135 the inertia 134 of the body 122 so as implement the determined modification of the spin/rotation 112. This control process is repeated periodically (e.g., nearly continuously) during the flight/fall 121 to control the rotation/spin 112 to achieve one or both of the target orientation 162 and the target pose 164 (e.g., to "stick" the landing).

With the system 100 and its operations in mind, it will be understood that the inventors were considering the challenge of creating an object or robot that spins in the air and lands in a specific orientation. As agile robots are designed to run and hop, the inventors believe they will soon also perform large jumps with high rates of spin that require graceful landing. To land properly, the robots will need to be aware of their relative body orientation during free fall (or flight) and make appropriate adjustments.

To this end, the inventors designed the presently described robots in part by examining the sensing and actuation (or drive mechanisms) necessary for a robot to alter its fall under a high rate of spin. One embodiment of the robot was labeled the Binary (or Bistable) Robotic Inertially Controlled brick (or BRICK). The BRICK or robot prototype integrates internal and external-looking sensing to track orientation of the robot during free fall and adjusts spin mid-flight/fall by rapidly changing or shifting the robot's moment of inertia between two states (hence, the use of the terms binary or bistable). An error analysis was performed during prototype testing that showed that mechanical inaccuracies and uncertainty to be the largest source of variation. Even with these issues, though, the BRICK was operable to fall from arbitrary heights with arbitrary spin (at launch or release) and then to land in a desired or target orientation by controlling spin or rotation in a horizontal plane.

As further background or introduction to these new robots with inertia shifting, it should be understood that as robots are moving beyond the factory and other tightly controlled environments they have learned to crawl, walk, and even run and occasionally jump. The robots are becoming more dynamic not just in their speed of movements but in their ability to handle underactuation, unstable balancing, and intermittent or limited control authority. Following these trends, the present description takes inspiration from exceptional human athletes such as gymnasts and divers who are able to stick their landings after multiple fast rotations or spins in the air. These athletes change their body pose at just the right time to alter their spin and bring themselves to the perfect orientation for landing.

The inventors asked themselves as part of the robot design process: (1) what are the limits of state estimation and control in situations where a robot is thrown through the air with a high rate of spin; (2) how well can position and orientation be tracked using onboard sensors; (3) what sensors are most suited for this task; and (4) what can be done to control the orientation for landing. In initial prototyping, the robot was launched/released so as to only (or mainly) spin about its central vertical axis, i.e., rotate rapidly in the horizontal plane. Then the challenge became whether or not, when the robot is dropped from an arbitrary height at an arbitrary initial angle and with an arbitrary angular speed (or rotation/spin rate), the robot can be operated (by an inertia shifting assembly) to always "stick the landing" by matching a desired or target orientation.

Figure 2:
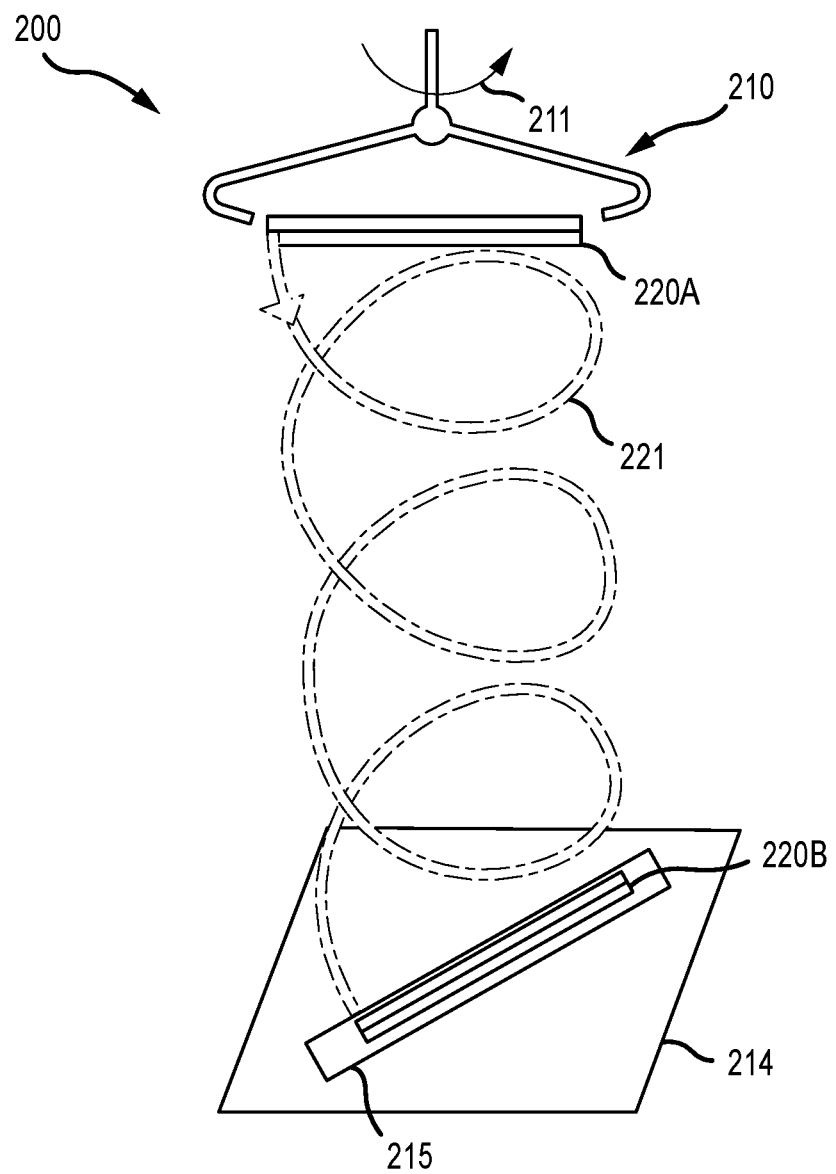
FIG. 2 is a schematic of a robot flight system with a spinning launch/release mechanism imparting rapid spinning of a robot as it begins its freefall onto a landing surface.

Accomplishing such orientation control would allow, for example, a robot with a high-aspect ratio to drop through a narrow slot or hoop during the free fall and/or alight on a narrow target platform or landing surface. If the robot's body is symmetric, the goal on impact can be achieved by two orientations that are 180 degrees apart. FIG. 2 illustrates a schematic of a robot flight system 200 showing a launch mechanism 210 that is spinning at a desired rate when it releases a robot 220A at an arbitrary angle to cause it to spin/rotate about its vertical axis. The robot 220A is equipped with an inertia shifting assembly of the present description (such as a binary drive) such that it controls its spin by shifting its moment of inertia at one (or more) points in the spinning/fall path 221 so as to have a desired orientation when landing upon surface 214 (e.g., to land upon small slot/target area 215 of surface 214).

Figure 3:
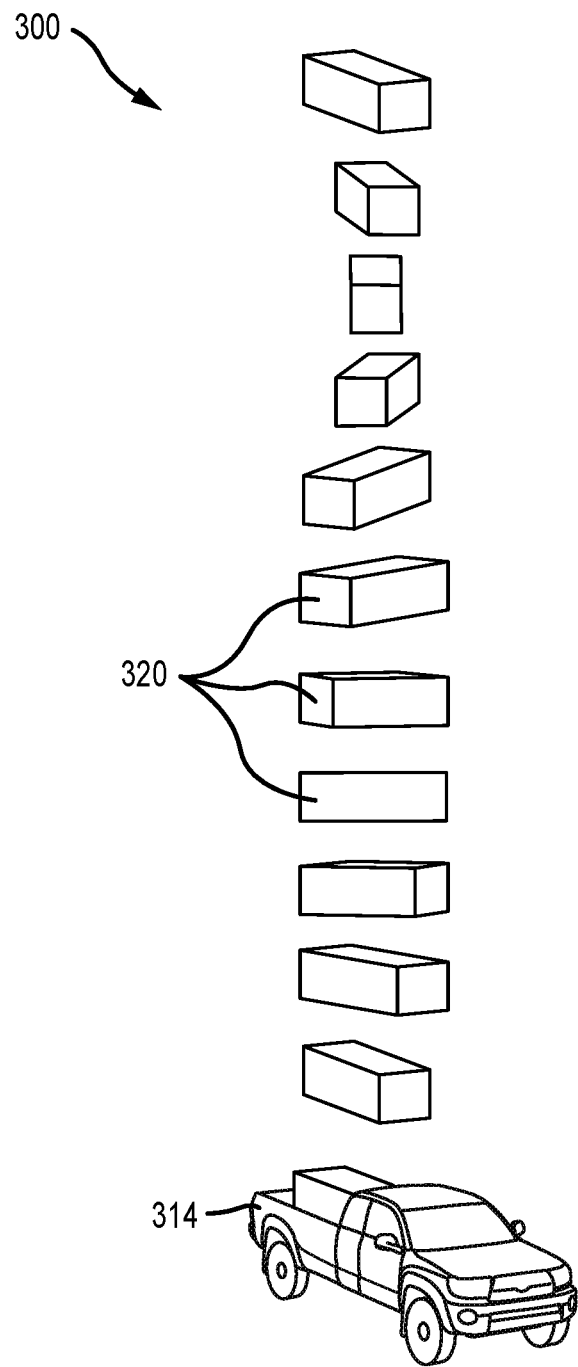
FIG. 3 is an image sequence showing a robot of the present description controlling shifting its inertia to control spin to land with a target orientation.

FIG. 3 is an image sequence 300 showing a robot 320 of the present description shifting its inertia (with an inertia shifting/moving assembly) to control its spin in the horizontal plane to land with a target orientation upon a landing surface 314 (which in this test of the prototype BRICK 320 is a bed of a toy truck). As shown in the sequence 300, the robot 320 spins through the air and lands in alignment with the bed/landing surface 314 of a truck. In another test, a guide with a slot was positioned between the launch mechanism and the landing surface, and the robot's inertia shifting assembly was successfully operated to cause the robot to have the desired orientation when it reached the guide so that it passed through the slot.

While the testing shown in FIG. 3 proved to be a successful implementation of the inertia shifting assembly in a robot 320 spinning in the horizontal plane, the inventors believe this proof of concept will guide the design, manufacture, and control of more complex applications such as a flipping robot that always can land on its feet, for fall recovery, for robust terrain navigation, and for legged robots that are able to change their moment of inertia with internal components (to land after both planned and unplanned leaps). The "binary" mechanism has been tested, and it will be understood that the inertia shifting or moving assembly may also be configured to include a drive mechanism (a motor and associated components) that can adjust locations of weight(s) over time during the freefall to shift the moment of inertia so as to control spin in one or more planes.

The drive or actuation mechanism 132 of the inertia moving assembly 130 (and as used in other embodiments herein) may take many forms to provide a controlled shifting or positioning of the moment of inertia for a robot. Aerospace applications typically involve controlling objects in free fall using thrusters, flywheels, and actuated appendages. In contrast for robotics with faster rotational dynamics and shorter flight times, the actuation/drive mechanisms described herein rely upon fully repeatable, mechanical options rather than thrusters, external appendages (which are not as useful when it is desired to orient the entire body of the robot and require a change in the external appearance of the robot in many cases), or flywheels (which do provide precise control and are reversible but add substantial weight and consume significant amounts of power).

The inventors were inspired by human athletes and also recognized the desirability of changing moments of inertia. In particular, the drive or actuation mechanisms for use in inertia shifting assemblies shift one or more internal weights such as perpendicular to the axis of rotation (for which spin/rotation is being controlled). This can be done by latching weights near the center of mass of the robot's body and then releasing the weights so they slide rapidly out to the ends of the robot either due to centripetal acceleration or with the assistance of a spring (or other mechanical actuator) (or the weights may be latched a distance away from the center of mass and rapidly slid toward the center of mass in some control applications (e.g., to speed up rotation)). No (or little) power is required, as in this example the only active actuation is releasing the latch, but other embodiments may include an electric motor or the like to allow the weight(s) to be moved more than once and/or to specific locations relative to the center of mass of the robot's body.

The angular momentum, L (which is conserved during ballistic flight) is given by: $L = I\omega$, where I is the moment of inertia around the axis and w is the angular velocity. If the moment of inertia changes from $I_1$ to $I_2$, the change in angular velocity is given by: $\omega_{new} = \omega_{old}(I_1/I_2)$. It can be assumed that the robot is in the air for an amount of time, $t_{fall}$. In order to guarantee an arbitrary landing orientation (or target orientation), the difference in final orientations between never changing inertia and changing inertia immediately should be larger than a full revolution: $(\omega_{old} - \omega_{new}) t_{fall} > 360$ degrees or $(\omega_{old} - \omega_{new}) t_{fall} > 180$ degrees (if the robot's body is symmetric). This can be rewritten in terms of initial angular velocity, $\omega$, and the different inertias, $I_1$ and $I_2$ as: $\omega(1 - I_1/I_2) t_{fall} > 180$ degrees. This shows that there is a minimum speed of spin required to reach an arbitrary goal orientation that depends on both the total time of flight and the size of the inertia change. It is a viable method of controlling final orientation when that condition is met and if the resulting motion is repeatable and well understood. In one prototyped robot or BRICK, $I_1$ was 60 percent of $I_2$, which means that when falling for one second a minimum speed of spin of 1.25 revolutions per second was required to hit an arbitrary goal or target orientation for this particular, but not limiting, implementation.

As with the drive or actuation mechanism for shifting inertia, the sensors (or sensor assembly) 150 of the inertia shifting assembly 130 for robot 120 (or other embodiments) may take a variety of forms to practice the invention. Generally, the sensors will include both internal sensors (inertial measurement units (IMUs), accelerometers, gyroscopes, magnetometers, and the like) and external (or external-looking) sensors (barometers, ultrasonic sensors, laser range finders, and the like). External-looking sensors are included in the sensors or sensor assembly of the robot because limitations on internal sensors can be overcome by adding external sensors.

With regard to internal sensors, a prototype robot was fabricated that used an IMU (e.g., an ST LSM6DS33) with a 3-axis accelerometer and a 3-axis gyroscope and that also used a 3-axis magnetometer (e.g., an ST LIS3MDL) to acquire information about pose. Each sensor has its strengths and weaknesses in light of the current challenge of fabricating a robot of the present description. The gyroscope on the IMU utilized had a measured noise floor of plus or minus 0.15 degrees/second when sampled at approximately 800 Hz. When at rest, the heading derived from the gyroscope readings drifts noticeably after a few tens of seconds of integration. Also, when spinning, it becomes desirable to precisely calibrate the scale of the gyroscope in each axis, as even very small errors in angular velocity can rapidly accumulate into large angular position errors. In the prototype robot, calibration allowed the controller to track orientation at several Hz with about 1 degree of error accumulated per revolution.

When at rest, the accelerometer can be used to resist drift in the gyroscope. The accelerometer precisely identifies the vertical, and it can reliably detect the onset of free fall and the impact with the ground. If the accelerometer is not located at the center of mass of the robot's body, it is useful to cancel out centripetal accelerations when spinning. Once in free fall, the accelerometer provides very little usable information, as drag forces on the body tend to be negligible, and the controller turns toward use of data from the gyroscope. Since the time of fall is on the order of seconds (with 1 second being the length of free fall in one prototyped control process), significant drift does not accumulate in the gyroscope heading during flight.

In some embodiments, it may be possible to integrate the accelerometer reading to provide an estimate of motion, but integration errors can accumulate after a few seconds (and centripetal accelerations should be carefully canceled). Hence, the controller of the robot's inertia shifting assembly may use the accelerometer to measure acceleration during a launch from ground level and predict flight time (instead of using external sensors to measure vertical position as discussed below). Also, a magnetometer can also be used to resist drift both at rest and in motion. In an environment where the Earth's magnetic field is consistent and larger than other sources of electromagnetic noise, the magnetometer can provide heading information in the horizontal plane (or orientation data). In embodiments that use a passive actuator for the drive mechanism (e.g., mechanism 132 in FIG. 1), the local electromagnetic noise is relatively small. However, in a building or other environment with large ferrous objects and/or powered machinery, the global magnetic signal may be so inconsistent both spatially and temporally as to be unusable.

With regard to external (or external-looking) sensors, it will be understood that determining the time of flight requires a knowledge of vertical height and initial velocity, both of which are observable by external sensing. The external sensor(s) could include a barometer (e.g., an ST LPS25H or the like) and an ultrasonic sensor (e.g., the HC-SR04 or the like). In some preferred embodiments, though, the external sensors include a laser rangefinder (e.g., a LIDAR-Lite v.1 laser rangefinder or the like). It is likely that both an ultrasonic and a laser rangefinder may be useful for measuring height over several meters at tens of Hz, but the tight beam of a laser allows for a secondary sensing goal to be achieved, i.e., determining the orientation of a target landing zone.

The beam from laser rangefinder is a cone (with the one used in prototyping/testing being a cone with an angle of 3 degrees), which allows it to "see" through small gaps at a distance of several meters. If the laser rangefinder is placed on the extreme end of the robot's body (or its interior space), then when the robot is rotated over a flat horizontal surface with a narrow slot in it, the rangefinder will sometimes be directly over the slot and sometimes directly over the surface. Thus, the controller of the robot's inertia shifting assembly can detect (via processing of the data from the rangefinder) the height of the robot above the target surface and the angle of the slot in the robot's reference frame. This allows the inertia shifting assembly to operate so as to control the robot's spin to allow the robot to pass through such slots or to adapt to the environment by detecting the orientation of a slot or platform (e.g., to pass through a hole/gap in an obstruction in the flight/fall path or to stick a landing on a platform/landing surface).

Figure 4:
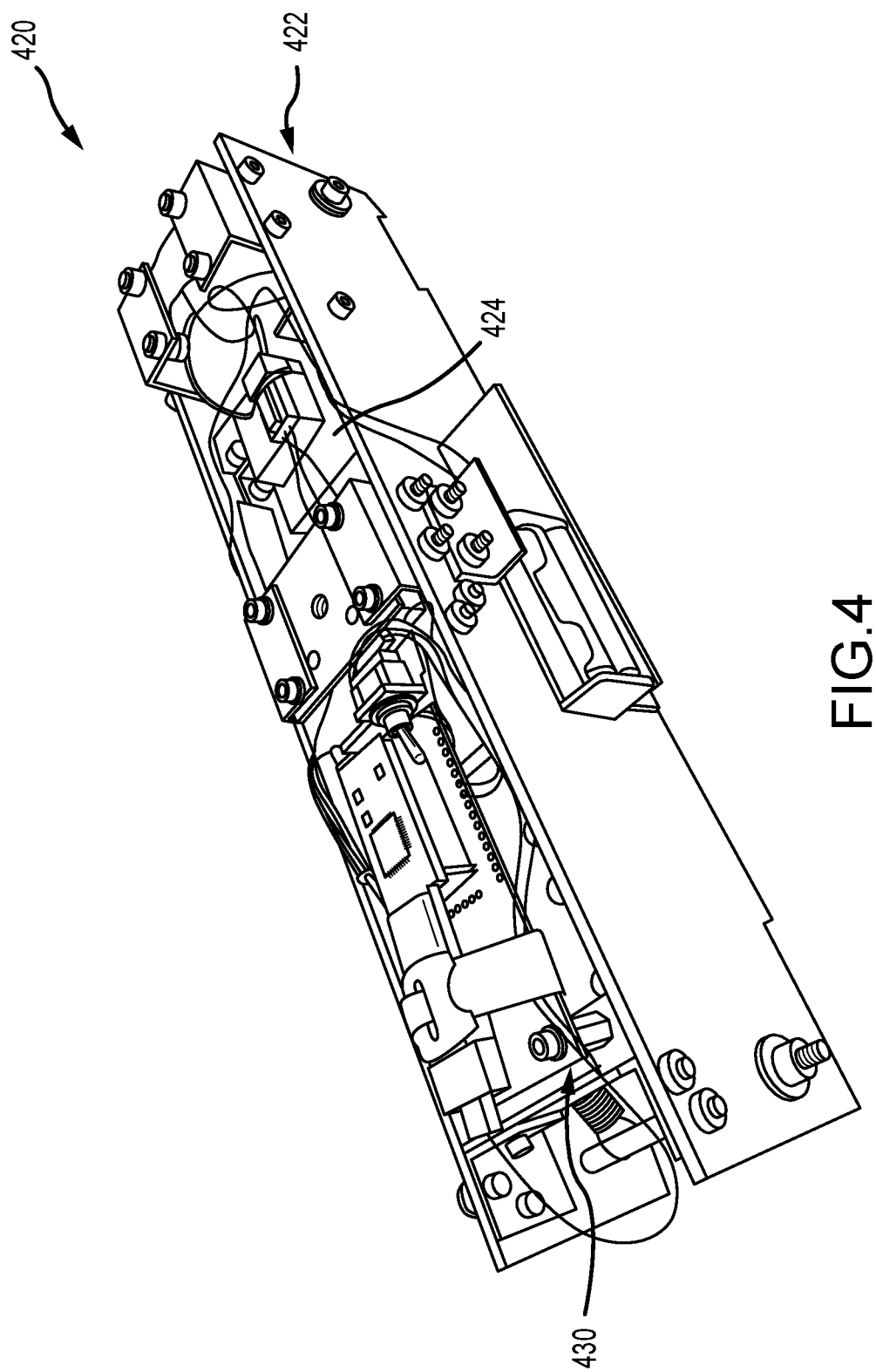
FIG. 4 is a top perspective view (with a top wall or cover removed) of an exemplary robot (or BRICK) of the present description.

The inventors fabricated and tested one prototype of the robot 120 of FIG. 1 with a binary drive mechanism 130 or as a "BRICK." FIG. 4 illustrates a top perspective view of the prototyped robot 420. The robot 420 is shown to include a housing or other shell 422 with a top cover or sidewall removed to display an inertia shifting assembly 430. As shown, the outer shell/body 422 has a high-aspect ratio and is rectangular in shape to define a rectangular interior space 424, and the inertia shifting assembly 430 may be positioned wholly (or nearly so) inside this space 424 (e.g., with external-looking sensors facing outward such as with holes/gaps carved in one outer sidewall of the body/housing 422). No appendages such as a tail are required to provide inertia shifting with the assembly 430 moving weight(s) within the space 424 to control spin or rotation about a central axis when the body 422 is spun about this central axis in a horizontal plane (i.e., a plane that contains a longitudinal axis of the shell/body 422).

The inertia shifting assembly 430 of the robot 420 was built around two weights (e.g., two 650 gram rectangular steel weights in a prototyped robot 420 whose overall weight was 2.6 kg) that were arranged for movement along a linear slide in the interior space 424 of the shell/body 422. A cable system was used in the assembly 430 to force the weights to mirror each other's movements, and spring members (e.g., steel springs) were used to pull them outwards within the space 424 toward the end walls of the outer shell/body 422. The weights and the slide of the assembly 430 are protected by the outer shell/body 422 (e.g., an aluminum shell). Also, the assembly 430 includes components for sensing, computation, and communication that are housed in, supported by, and protected by the shell 422 in the interior space 424.

In the prototyped robot 420, an IMU and a rangefinder (e.g., an ST LSM6DS33 and a LIDAR-Lite laser rangefinder) were used to detect the robot's position and its orientations. Computation (or the controller) was provided with a microprocessor (e.g., a Teensy 3.1 microprocessor) configured with logic and control software, and communications were provided with a radio (e.g., an Xbee radio) that was operated to report state variables back to an offboard computer for logging during test runs. A servo (e.g., a Hitec HS-45B servo) was used (e.g., its arms) to hold or latch the weights near the center of the interior space 424 and shell 422 (or near the center of mass of the robot 420), and the servo released the hold/latch (by moving its arm out of the way) to release the weights at the right time (or time chosen by the controller) causing them to slide outward and change/shift the moment of inertia of the robot 420 to control spin (slow spin) and achieve a desired target orientation upon landing.

Figure 5:
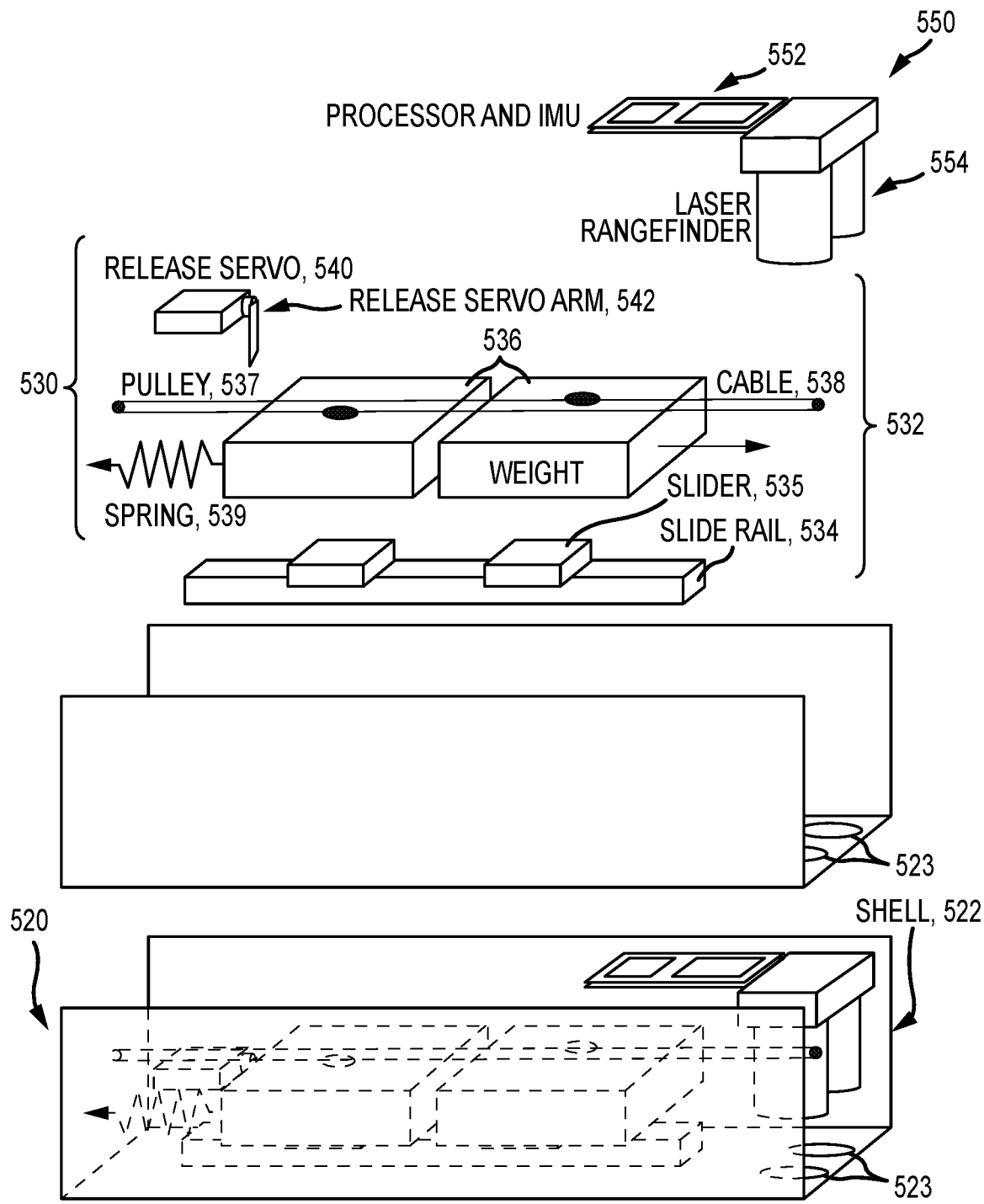
FIG. 5 is an exploded view of one embodiment of a robot with inertia shifting providing spin/rotation control (e.g., one implementation of the robots of FIGS. 1 and 4)

FIG. 5 illustrates, respectively, an exploded side perspective view and assembled cutaway view (with a front sidewall being transparent) of one embodiment of a robot (or BRICK) 520 that is adapted to provide binary inertia shifting to provide spin/rotation control during flight. The robot 520 is shown to include a rectangular-shaped outer shell or body 522 with sidewalls that define a rectangular interior space for housing and supporting an inertia shifting assembly 530. The bottom sidewall of the shell/body 522 includes openings or holes 523 for providing a sightline for external-facing sensors (e.g., the laser rangefinder 554). In this regard, the inertia shifting assembly 530 includes a sensor assembly 550 in the form of internal sensors and a controller (e.g., an IMU and a processor/software) 552 combined with an external sensor (e.g., a laser rangefinder) 554, with the external-facing sensor 554 positioned adjacent to or exposed to the holes/openings 523 to allow it to sense surfaces or the like external to the shell/body 522.

The inertia shifting assembly 530 further includes a drive mechanism 532 that includes a slide rail 534 mounted to the bottom sidewall of the shell 522 along with a pair of sliders 535 for slidingly supporting a pair of weights 536 upon the slide rail 534. The drive mechanism 532 also includes a cable 538 extending over a pair of spaced apart pulleys 537 (located at each end of the shell 522) and a spring(s) 539. A release servo 540 is included that selectively latches/retains the weights 536 in an initial position near the center axis and/or center of mass of the robot 520 (or its body 522 when assembled) and, when controlled by signals from the processor 552, acts to move the servo arm 542 to release the weights 536 which are quickly slid outward away from the center of mass (toward the ends of the shell along the linear slide 534 with urging by the spring 539 (or by a spring force along with centripetal forces)). In this manner, the inertia of the robot 520 is shifted during flight/operations of the robot 520 to control the robot's spin/rotation during freefall.

In one prototype of the robot 520, a piece of steel with a threaded hole was attached to the top of the robot and lined up vertically with the center of mass. This let the testers screw the robot's body onto a screw affixed to a ceiling of a test space. When the robot was spun clockwise by hand, it released from the screw (e.g., a very basic launch mechanism 110 in FIG. 1) and fell to the ground (e.g., onto a landing surface with control provided to achieve a target orientation upon landing). To release the robot/BRICK, the robot was spun by hand at a rate between 1.5 and 4 revolutions per second. Since the screw was fixed to the ceiling, the robot left the screw in roughly the same orientation every time. To make sure this was not biasing the results, the screw was rotated ninety degrees halfway through the testing, with no noticeable difference in results. To ensure that the robot fell straight down, the threaded hole in the body was lined up with the robot's center of mass.

Turning now to a useful framework for sensing and control, a robot was fabricated to test the spin control method. The controller was provided logic/software (a control program) that combined data from an accelerometer, a gyroscope, and a laser range finder to determine when to actuate the release servo (i.e., when to shift inertia from a first location/value to a second location/value). On startup, the robot is controlled so as to assume that it is at rest and to use data from its accelerometer to determine which way is up. The robot's orientation on power up/startup is assumed to be the zero position in the horizontal plane.

Orientation is tracked as a quaternion, q, which is updated by the gyroscope reading, $\omega$, at every time step as: $d/dt(q) = \frac{1}{2}[\omega_x, \omega_y, \omega_z, 0] \times q$. When the robot/BRICK is at rest, the data from the accelerometer is used to compensate for the drift in the gyroscope. This is done by taking the cross product of the internal estimate of vertical, $z_i$, with the accelerometer measurement of vertical, $z_w$, to create a correction term, $\omega_a$, that is equal to the error caused by the drift given by: $\omega_a = z_i \times z_w$. The correction term, $\omega_a$, is then scaled by a constant, $\lambda$, setting the speed or bandwidth of the drift compensation. The scaled result is subtracted from the gyroscope's measured $\omega$ to make the adjusted value, $\omega_{adjusted} = \omega - \lambda \omega_a$, which is then used to update the q as shown above.

Figure 6:
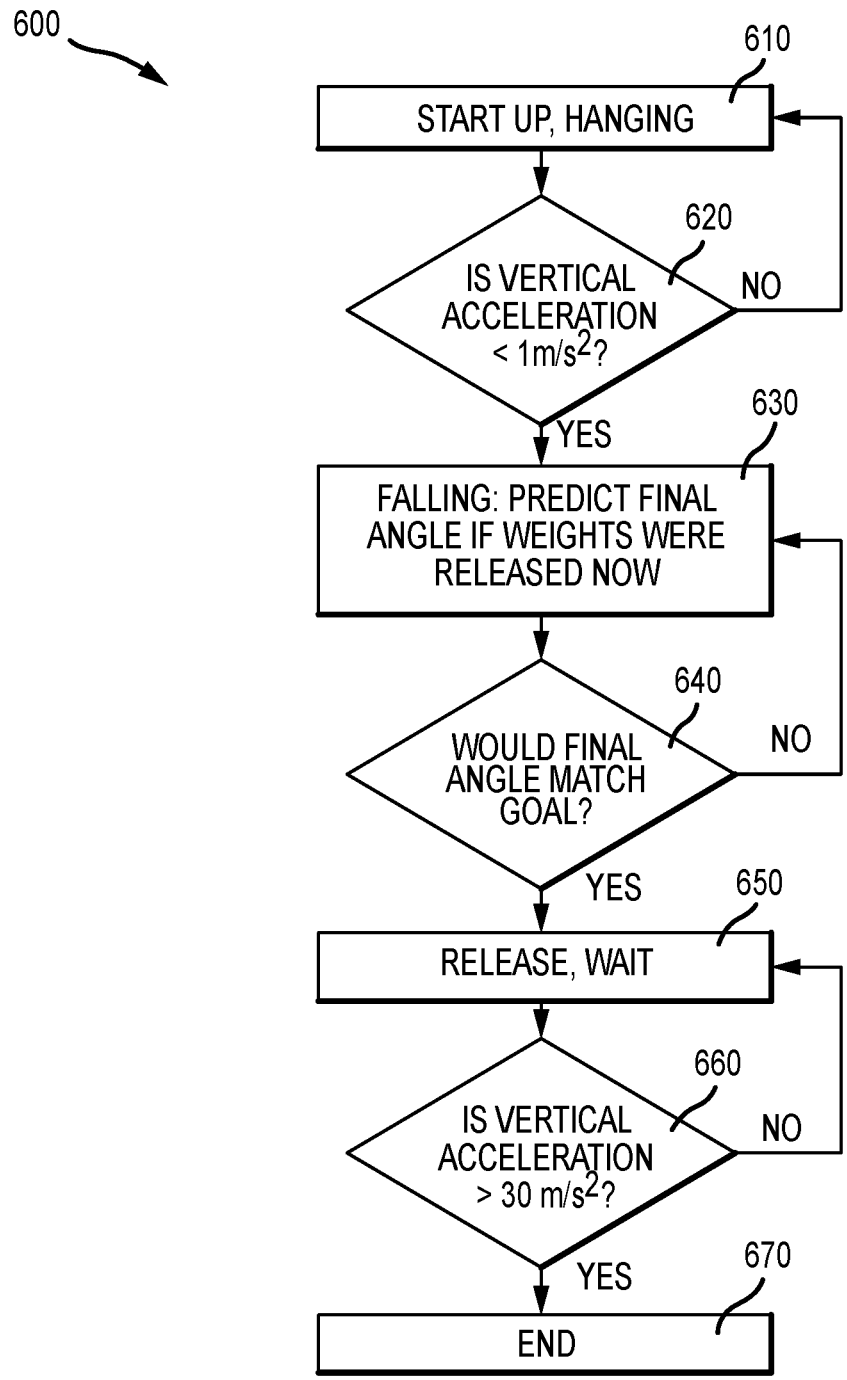
FIG. 6 is a flowchart showing the logical framework for the robot's control program or state machine during inertia shifting (or spin control)

FIG. 6 provides a spin control method 600 for a robot/BRICK of the present description (i.e., a state machine that controls the logic of the prototyped BRICK). At 610, the method 600 begins with the robot being supported by a launch mechanism and with the robot's inertia shifting assembly being initiated (e.g., its internal and external sensors start gathering data that is processed by the controller (processor and control logic)). At 620, the controller determines whether the robot has been launched/dropped by testing whether vertical acceleration is below some predefined threshold (such as 1 m/s). If not, the method continues at 610. When the robot sees the acceleration in the vertical axis (e.g., smoothed using a 20 Hz averaging filter or the like) drop below a threshold, the algorithm 600 reviews logged vertical acceleration data to find out when the raw accelerometer reading dropped below the threshold for free fall. It then uses the height measurement from the laser rangefinder from that time step to estimate the total falling time, $T_f$, as: $T_f = (2h/g)^{1/2}$, where h is the measured height and g is acceleration due to gravity.

The method/state machine 600 then uses the following formula, in step 630, to estimate the final orientation, $\Theta_{final}$, if the release of the weights (the shifting of inertia) were to be triggered/commanded by the controller immediately (now) as: $\Theta_{final} = \Theta + \omega T_r + \omega R_t T_w + \omega R_f (T_f - T_r - T_w - t)$, where $\Theta$ is the current estimated angle in the horizontal plane, $\omega$ is the current angular velocity about the vertical axis, $T_r$ is the time required for the servo to release the weights, $T_w$ is the time required for the weights to slide to the end of their travel, $R_t$ is the ratio of the average angular velocity while the weights are sliding over the current angular velocity, $R_f$ is the ratio of the first angular velocity after the weights have reached the end of the their travel over the current angular velocity, $T_f$ is the total fall time calculated from the initial height measurement, and t is the time elapsed since entering free fall.

At 640, the control method 600 involves comparing the predicted orientation with the target orientation. If no match, the process continues at 630. When $\Theta_{final}$ goes from just before the target position to just after it, at 650, the command is sent by the controller to raise the servo arm and release the weights. Step 660 is used by the controller to determine when landing has occurred, and the method 600 ends at 670 after landing. After the servo arm is set to the correct position during startup, the servo does not receive any signals from the processor/controller until this trigger/release command is set at 650. This is to make sure that the servo responds right away instead of waiting for its own update loop (e.g., a 50 Hz loop) to complete.

Figure 7:
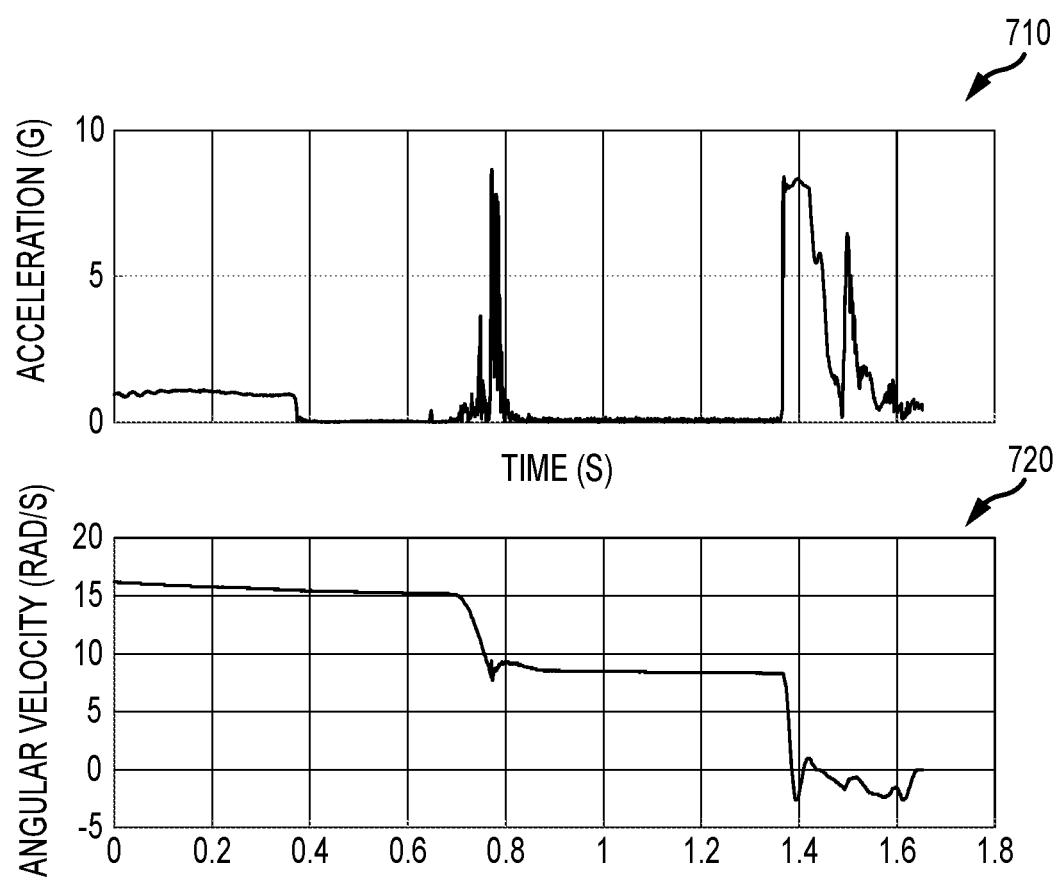
FIG. 7 illustrates a pair of graphs showing, respectively, a typical set of acceleration measurements and a typical set of angular velocity measurements obtained during experiments testing operations of the robot of FIG. 5.

During testing, the passive drops resulted in random final orientations, while the addition of control via shifting of the inertia (by sliding the weights outward on the slide rail) produced consistent final orientations of the outer shell. FIG. 7 illustrates a typical set of acceleration measurements with graph 710 and a typical set of angular velocity measurements with graph 720 obtained during experiments testing operations of the robot 520 of FIG. 5. The final prototype missed the goal orientation by 1 degree plus or minus 9 degrees (n=10). This error was assumed to be caused by drift and noise in the sensors and by variability in the physical system. Four sources produced most of the variability in the system, with two being mechanical and two being caused by sensor error.

Figure 8:
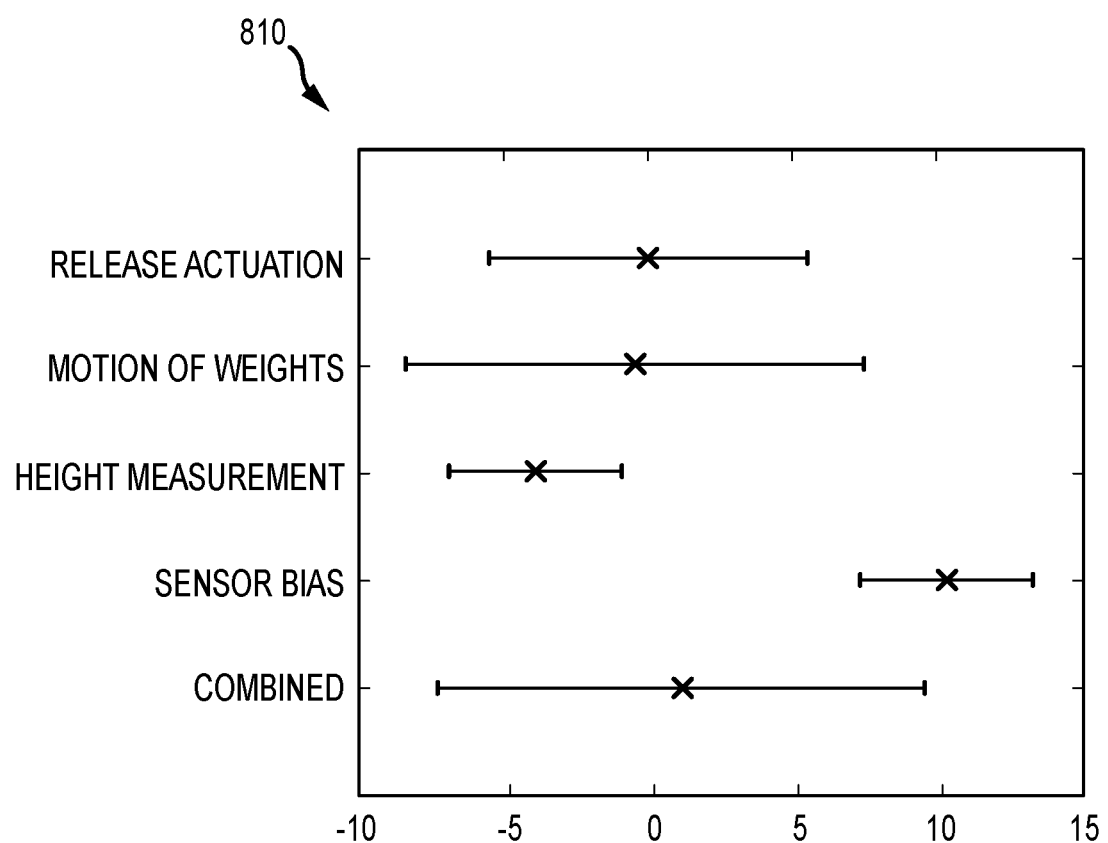
FIG. 8 illustrates a graph providing estimated variability caused by four principal error sources, with final error in target pose at the far right.

FIG. 8 provides a graph 810 showing estimated variability caused by these four sources. The error bars represent standard deviation from the mean, and the magnitude of each error may be correctable in software by updating constants. Also, reducing the variability in each error source may be achieved via some combination of better mechanical design, more complicated modeling, and/or better sensors. The graph 810 quantifies the effect of each of these error sources: the time needed to release the weights; the motion of the weights; and the height measurement and the accumulated inaccuracies in heading and estimation. For each source, the individual variations were measured and converted into angular displacements. The average bias that resulted from these factors was then plotted, with bars that show the standard deviation to give a sense of the relative variability caused by each error source. Each error source is discussed more detail below.

A first mechanical error source is release actuation. The weights in the robot prototype were held in place by a small servo arm. When release is commanded, the time at which the weights are actually free to move varied due to factors like friction, servo battery level, servo firmware, and angular velocity. The exact time that the weights begin to move is difficult to estimate, but it usually was accompanied by a small spike in the acceleration data. This time was then converted to an estimated angular error by multiplying the difference between the actual and expected time of actuation by the average angular velocity (as plotted in FIG. 8). To reduce the error associated with this mechanical source, the inventors halted code execution at release time to send the appropriate pulse instead of using a background library function to drive the servos. Despite this and the relatively low-friction plastic surface of the servo arm, release actuation is one of the largest sources of variability.

Figure 9:
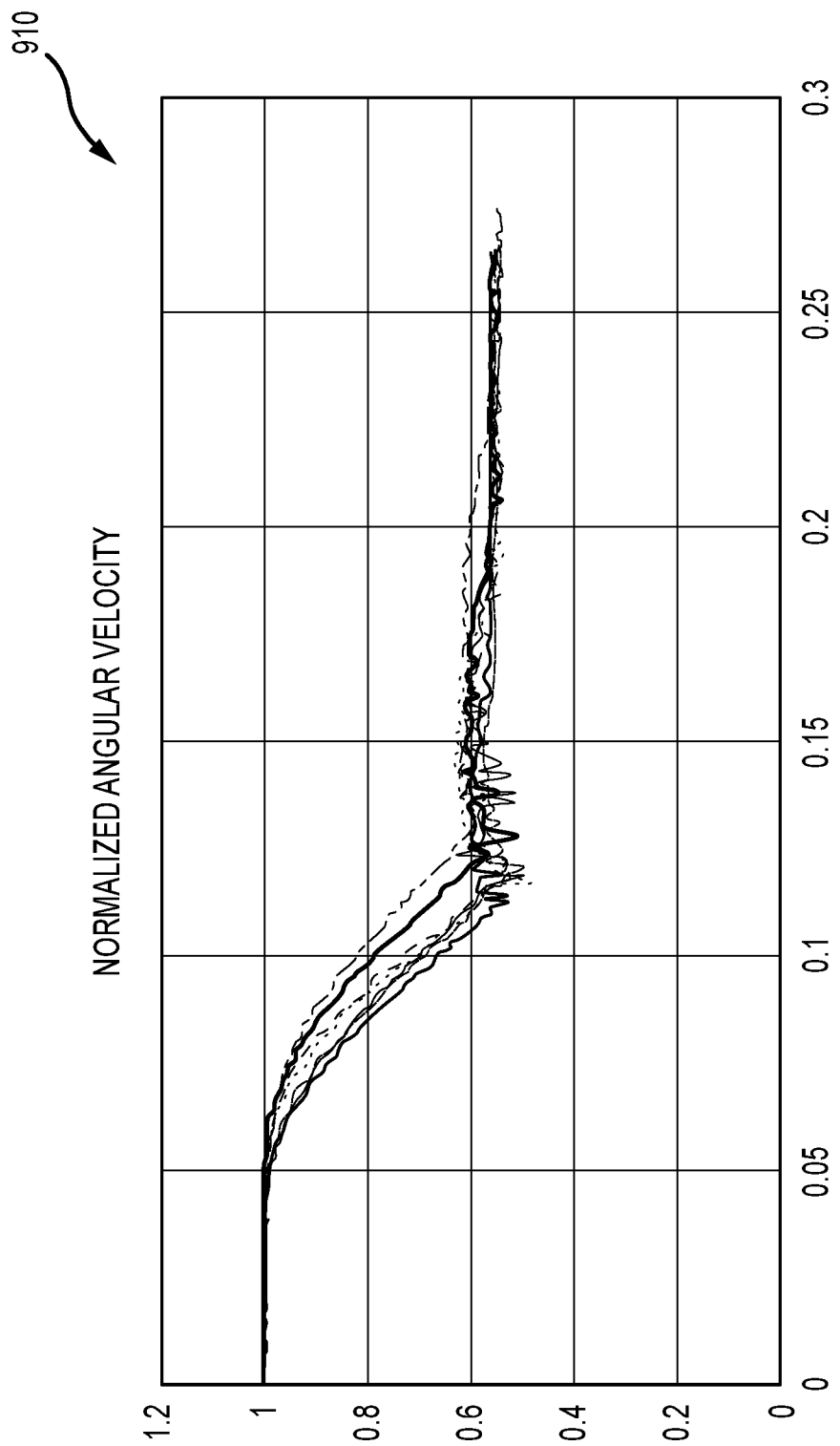
FIG. 9 is a graph showing consistency in actuation in a controlling one exemplary robot or BRICK implementation of the design of FIG. 5.

A second mechanical error source is motion of weights. If the weights are not driven by a spring, the forces exerted on them will be proportional to angular velocity. The springs used in one prototype dominate but do not eliminate this effect. Friction along the slider is another source of variability in this case, as is stretch in the cable connecting the two weights. If the variation was primarily caused by changing angular velocity, it could be compensated for in the control software. However, the above difficulties in finding out exactly when weights begin to move make it difficult to parse how much of the variation is caused by differences in angular velocity and how much of it is caused by friction. FIG. 9 provides a graph 910 providing an overlay of normalized angular velocity versus time for ten consecutive trials showing the repeatability of the spring-driven transition from one configuration to another. Graph 910 shows the consistency of actuation achieved so far by overlaying ten series of angular velocity measurements in the quarter second after actuation is commanded. Variability in the motion of the weights is the single largest source of variation (as shown in graph 810 of FIG. 8).

Figure 10:
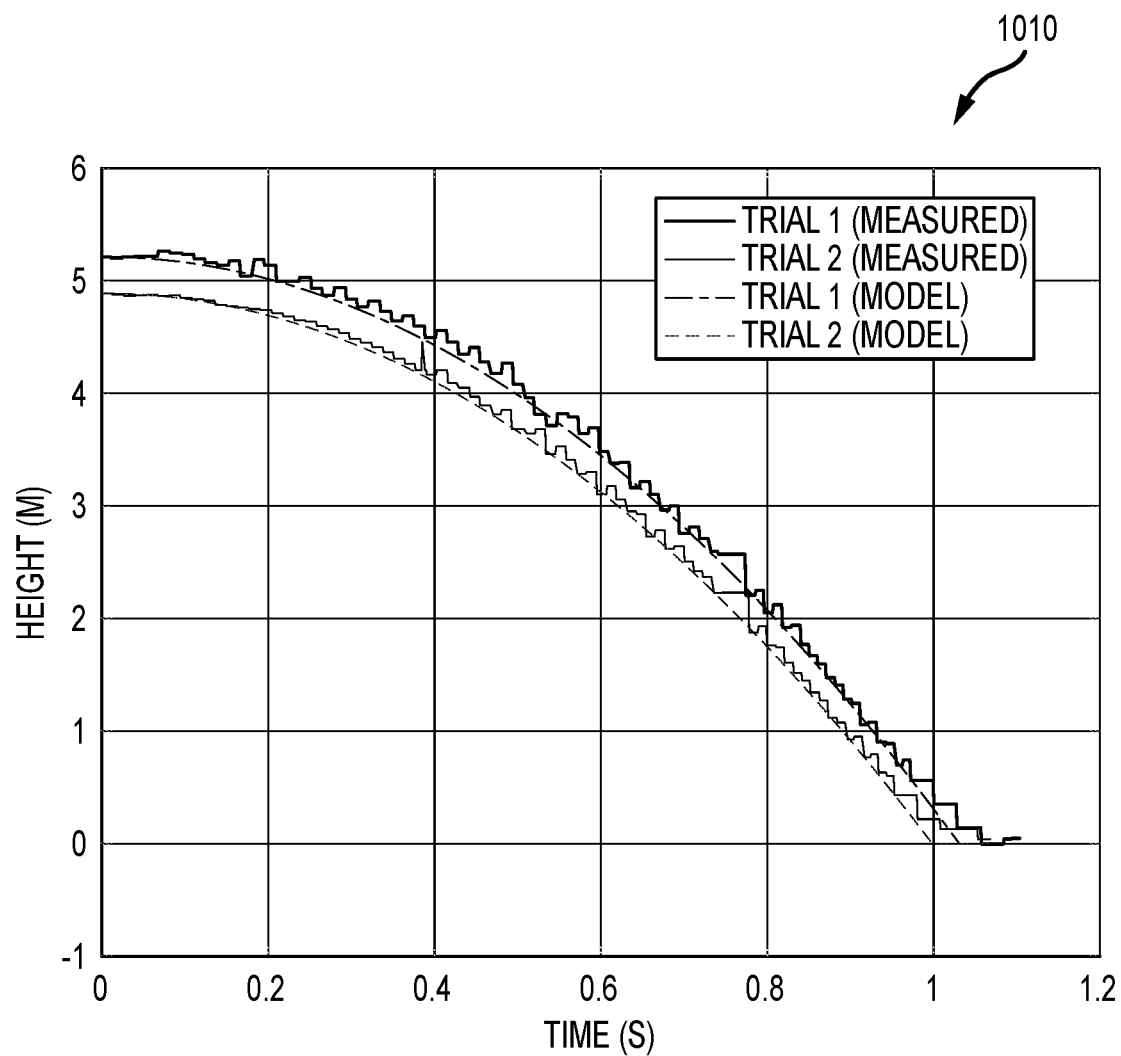
FIG. 10 is a graph of modeled versus measured data for a typical fall/flight of a robot with the design of FIG. 5.

A first sensor error source is height measurement. The height sensor provides an estimation of starting height once free fall is detected, which can then be used to estimate the time the robot spent in the air. This can then be compared to the actual time of flight as measured by observing the accelerometer spike caused by impact. The difference in time multiplied by the average velocity gives an estimated error from this measurement (as shown in FIG. 8). The initial measurement can be used, and a height prediction can be determined from this based on simple dynamics, neglecting drag. The estimate can be updated during flight by comparing the model to new measurement, but, in practice, there is likely not a strong need to do this since the model predicts the data relatively closely. Two optical sets of height measurement are plotted in the graph 1010 of FIG. 10, along with the valued predicted by the model. Graph 1010 shows modeled versus measured data for a typical fall, and the model is shown to match the measurement closely but with less noise.

A second sensor error source is pose estimation. When the robot impacts the ground/landing surface, its actual pose differs from its internal calculated orientation. The difference between actual and internal pose is a measurement of sensor bias and is plotted in the graph 810 of FIG. 8. This bias can result from scaling issues and from at-rest offset. The inventors are fairly confident that the offset is small because the robot is left at rest for a second on startup to calibrate the offset and will not operate if it detects too much variability in the gyroscope signal (indicating motion). The source of this bias comes from drift in the gyroscope and in the integration of the measurements over time.

With regard to design lessons, the preceding sections show that error comes from both mechanical design and sensing inaccuracies. The largest variability comes in fact from mechanical issues: the release of the servos and the motion of the weights. In order to achieve precise angular results when falling at high spin rate, it is useful that the mechanical system be made as repeatable as possible. In the robot prototype, unpredictable factors were limited or reduced such as friction along the linear slide and between the servos and the weights, but improved performance may be achieved with the BRICK/robot designs taught herein. The current control scheme is relatively unforgiving to even small variations in physical response. If the weights were released continuously by a motor or variable brake (as discussed below) instead of all at once by a single binary input, there may be more opportunities to compensate for mechanical variability and sensing errors may become the larger source of variation.

Figure 11:
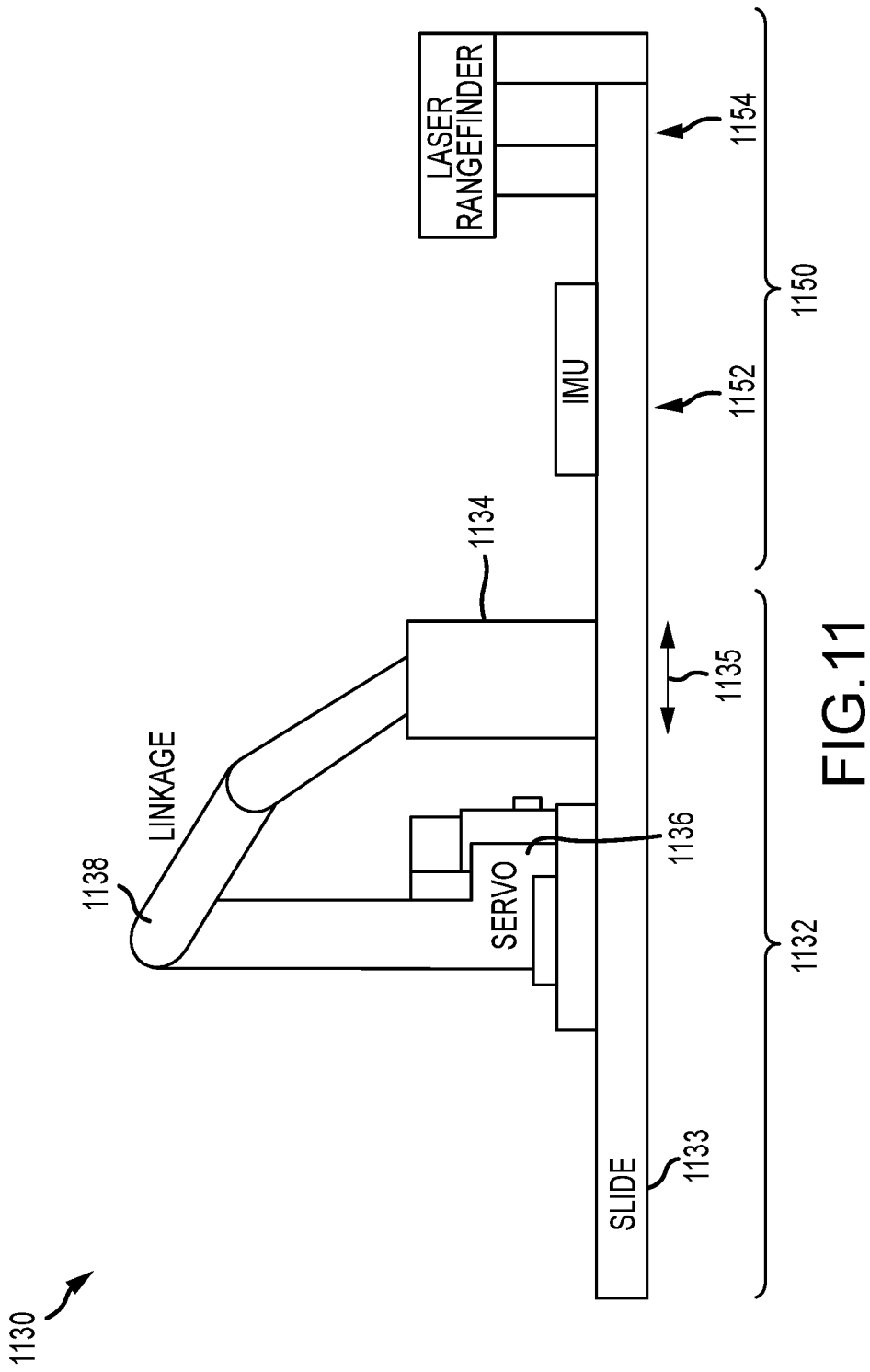
FIG. 11 is side view of an inertia shifting assembly utilizing a single weight along with a configuration for periodic and/or continuous shifting of inertia to control spin.

In some embodiments, the inertia shifting assembly (such as assembly 130 of FIG. 1) may be implemented so as to provide periodic (so short as to be nearly continuous in some cases) shifting/movement of inertia during a flight (or freefall) of a robot to control its spin to achieve one or more desired orientations (or poses) at one or more points in the flightpath. FIG. 11 illustrates one useful inertia shifting assembly 1130 that may be placed in an outer shell or body (not shown but may be as shown in FIGS. 4 and 5) of a robot so as to be wholly enclosed and protected and so as to not add appendages or change the outer form factor of a robot.

The assembly 1130 includes a sensor assembly (or set of sensors) 1150 that includes an IMU (or internal sensor) 1152 and a laser rangefinder (or external sensor) 1154 that gather data as discussed above that is useful for predicting orientation (and/or pose) at points in the flightpath and/or at landing and for determining whether a target orientation (and/or pose) will be achieved at these points. A controller (not shown but understood from prior descriptions of the robots of the present description) processes this data to provide these predictions and determinations and to issue control signals at one, two, or more points in the flightpath to modify inertia so as to change the spin/rotation rate(s) so as to align predicted orientation (and/or pose) with a target orientation (and/or pose). The frequency of these predictions and generating of control signals may be relatively rapid such that shifting (when needed) of inertia may be on a nearly continuous basis during freefall (or at least periodic).

The control signals are used to operate a drive mechanism or assembly 1132 of the assembly 1130. Specifically, the signals cause a servo/motor 1136 to move a weight 1134, which is attached to the end of a linkage 1138. The weight 1134 is also slidingly supported upon or engaged with a slide (or rail upon the slide) 1133 such that weight 1134 is moved or shifted in either direction as shown by arrow 1135. In practice, the weight 1134 may be shifted/slid 1135 a relatively small distance in either direction from the center of mass (e.g., to a fraction equal to one fourth or less of the length of the slide), kept at or returned to the center of mass, and/or shifted/slid 1135 a relatively large distance in either direction relative to the center of mass (e.g., to the outer ends of the slide 1133). In this manner, inertia can be shifted none, one, two, three, or more times during freefall to adjust spin/rotation (as described above such as with reference to FIG. 6 and method 600). The control signals from the processor may be simple commands indicating the servo 1136 should move/shift 1135 the weight 1134 to one end of the slide 1133 or may be more complex indicating a particular position between the center of mass and one of the ends of the slide 1133.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As robots move in more dramatic and dynamic ways, the need for tracking and modifying in-flight orientation will become more common. This description has presented useful mechanical systems that are capable of changing inertia with the high level of repeatability desired for reaching a target orientation upon landing (or at a particular point in the flight path such as to fly through an opening in an obstacle). The information from accelerometers, gyroscopes, and a laser range finder were combined to estimate orientation (or pose), and the noise introduced by each was noted. A more active system was also shown that had a higher power draw and involved a drive mechanism adapted to be controlled to provide continually adjusting moment of inertia, which relaxes the constraints of the BRICK's design while shifting complexity to the controller.

The concepts taught herein may readily be expanded for use with robots with a horizontal spin axis. This represents challenges in separating inertial accelerations from gravity and in detecting height while rotating towards and away from the ground plane. Such flipping motions, however, may lead to dramatic robotic capabilities. The high performance and ever decreasing cost of MEMS and LIDAR sensors continue to enable new applications for the concepts taught herein.

It will be clear to one skilled in the robotic arts that while specific examples show internal elements, many if not all the elements may be either internally or externally located to practice the present invention. For example, the mechanical elements (weights) could be internal or external to the body, e.g., provided in the form of limbs. As another example, the sensor elements could be internal or external, i.e., off-board sensors such as a motion capture system or other tracking system. As yet another example, the controller could also be off-board via radio or the like. Hence, it should be understood that one unique aspect of the present description is calculating height/time to go and predicting orientation/pose.

With regard to the described robot, it may be appreciated that, while the embodiment described an internal mechanism for inertia shifting, any of the sensing, actuation, or control elements could also be used with an external inertia shifting mechanism or be used with external limbs for inertia shifting. It may further be appreciated that external or sensing elements, such as a motion capture system or other tracking system, could be used to sense the present pose or orientation or angular velocity or height or vertical velocity. Still further, it may be appreciated that the controller and processing could be located external to the mechanism with commands being transmitted via some form of radio.

The definition of pose versus orientation were chosen to be and intended to be those used by people skilled in the art of robotic controls. The robot may be controlled to rotate and to control rotation horizontally, vertically, or about any axis. Landing both "on feet" and "facing a desired direction". With regard to time to impact versus height (distance from landing surface), it should be understood that for a known velocity these are basically interchangeable and the description and following claims are meant to be construed with such an understanding of these concepts. Other terms are also intended for their normal or conventional use such as radians and using pi and 2*pi for a half and full rotation but one could also note that 2 pi=360 degrees, pi=180 degrees, and 2.5 pi rad/sec=1.25 revolutions per second. "Nearly continuous" in the above description could be replaced with control and/or operations that are periodic, rapid, or even continuous. Also, inertia shifting is described as including none, one, two, or more times and such a description is intended to include inertia being shifted continually. Further, while some embodiments use two weights, it will be understood that one weight or more than two weights may be used in some useful implementations.

We claim:

1. A robot adapted to have spin control, comprising:
a body with an interior space; and
an inertia shifting assembly, comprising:
  a sensor assembly collecting sensor data for the robot during a freefall;
  a controller processing the sensor data to generate a control signal; and
  a drive mechanism operating in response to the control signal to shift the moment of inertia of the robot to modify rotation during the freefall,
wherein the drive mechanism comprises at least one eight and an assembly for moving the at least one weight relative to the center of mass of the robot in response to the control signal,
wherein the drive mechanism of the inertia shifting assembly is wholly positioned within the interior space,
wherein the controller processes the sensor data to predict an orientation of the body at a point of the freefall, to compare the predicted orientation to a target orientation for the body at the point of the freefall, and to generate the control signal to cause the predicted orientation to match the target orientation,
wherein the moving of the at least one weight relative to the center of mass comprises moving the at least one weight from a first position in the interior space relative to the center of the mass to a second position in the interior space relative to the center of mass of the robot, and
wherein the drive mechanism releases the at least one weight to move from the first position to the second position under centripetal force.

2. The robot of claim 1, wherein the sensor assembly includes an external looking sensor and an internal sensor, wherein the controller determines a present orientation of the body and a height of the body above a landing surface, and wherein the present orientation and the height are used to determine the predicted orientation.

3. The robot of claim 2, wherein the external-looking sensor comprises a rangefinder.

4. The robot of claim 1, wherein the assembly for moving the at least one weight includes a release operable to retain the at least one weight proximate to the center of mass and to release the at least one weight to travel from a first position to a second position within the interior space in response to the control signal.

5. The robot of claim 1, wherein the assembly for moving the at least one weight includes a rail for slidingly supporting the at least one weight.

6. The robot of claim 1, wherein the rotation is about a vertical axis orthogonal to a horizontal plane passing through the body of the robot.

7. A robot adapted to have spin control, comprising:
an inertia shifting assembly comprising:
  an external-facing sensor;
  a controller processing data from the external-facing sensor to determine a height of the robot above a landing surface during a freefall h the robot and wherein the controller further generates, based on the height, a predicted orientation upon contact with the landing surface at an end of the freefall and outputs a control signal based on the predicted orientation; and
  a drive mechanism operating in response to the control signal to shift inertia of the robot to reduce or increase a spin rate of the robot; and
an outer shell, wherein the drive mechanism includes one or more weights, wherein the drive mechanism operates in response to the control signal to move the one or more weights from a first position in the outer shell relative to the center of mass of the robot to a second position in the outer shell relative to the center of mass of the robot, and wherein the drive mechanism is a binary device operable once during the freefall to release the one or more weights to move from the first position to the second position under centripetal force.

8. The robot of claim 7, further comprising an outer shell, wherein the inertia shifting assembly is wholly positioned within an interior space defined by the outer shell.

9. The robot of claim 7, further comprising an outer shell, wherein the external-facing sensor comprises a laser rangefinder and wherein the outer shell includes an opening providing a view path for the laser rangefinder to the landing surface during the freefall.

10. The robot of claim 7, wherein the inertia shifting assembly further includes additional sensors, wherein the controller processes output of the additional sensors to determine a present orientation of the robot during the freefall, and wherein the controller uses the height and the present orientation to determine the predicted orientation.

11. A robot adapted to have spin control, comprising:
a sensor assembly collecting sensor data for the robot during a freefall;
a controller processing the sensor data to generate a control signal; and
a drive mechanism operating in response to the control signal to shift the moment of inertia of a body of the robot, wherein the controller processes the sensor data to predict an orientation of the body at a point of the freefall, to compare the predicted orientation to a target orientation for the body at the point of the freefall, and to generate the control signal to cause the predicted orientation to match the target orientation, wherein the sensor assembly includes an external-looking sensor and an internal sensor, wherein the controller determines a present orientation of the body and a height of the body above a landing surface, wherein the present orientation and the height are used to determine the predicted orientation, wherein the present orientation and the predicted orientation are positions of at least one of a horizontal axis of the body as the body is rotated relative to a central vertical axis of the body and a vertical axis of the body as the body is rotated relative to a central horizontal axis of the body, wherein the drive mechanism operates in response to the control signal to move one or more weights from a first position relative to a center of mass of the body of the robot to a second position relative to the center of mass of the body of the robot, and wherein the drive mechanism is a binary device operable once during the freefall to release the one or more weights to move from the first position to the second position under centripetal force.

12. The robot of claim 11, wherein the external-looking sensor comprises a laser rangefinder.

13. The robot of claim 11, wherein the body includes an interior space and wherein the drive mechanism is positioned within the interior space and comprises at least two weights and an assembly for moving the at least two weights equal distances relative to the center of mass of the body of the robot and in opposite directions relative to each other in response to the control signal.

14. The robot of claim 13, wherein the assembly for moving the at least two weights includes a release operable to retain the at least two weights proximate to the center of mass and to release the at least two weights to each travel from a first position to a second position within the interior space in response to the control signal.

15. The robot of claim 13, wherein the assembly for moving the at least two weights includes a rail for sliding y supporting the at least two weights.

16. The robot of claim 11, wherein the internal sensor comprises at least one of an inertial measurement unit (IMU), a gyroscope, and an accelerometer providing data processed by the controller to determine the present orientation of the body.

* * * * *